(12) United States Patent
Anderson

(10) Patent No.: US 7,660,494 B2
(45) Date of Patent: Feb. 9, 2010

(54) FIBER OPTIC FUEL DETECTION SYSTEM

(75) Inventor: Steven A. Anderson, Saint Louis, MO (US)

(73) Assignee: The Boeing Company, Chicago, IL (US)

(*) Notice: Subject to any disclaimer, the term of this patent is extended or adjusted under 35 U.S.C. 154(b) by 352 days.

(21) Appl. No.: 11/837,717

(22) Filed: Aug. 13, 2007

(65) Prior Publication Data

US 2009/0076744 A1 Mar. 19, 2009

(51) Int. Cl.
G02B 6/00 (2006.01)
G01F 23/00 (2006.01)

(52) U.S. Cl. ............ 385/12; 385/39; 385/123; 356/614; 702/55

(58) Field of Classification Search ............ 385/12, 385/39, 123; 356/614; 702/55
See application file for complete search history.

(56) References Cited

U.S. PATENT DOCUMENTS

| | | | |
|---|---|---|---|
| 4,342,919 A | 8/1982 | Brogardh | |
| 5,164,608 A | 11/1992 | Vali et al. | |
| 6,801,678 B2 * | 10/2004 | Murshid | 385/12 |
| 7,049,622 B1 | 5/2006 | Weiss | |

OTHER PUBLICATIONS

Moynihan et al., "Optoelectronic Liquid-Level Gauges for Aircraft Fuel Tanks", NASA Tech Briefs NPO20105, Jet Propulsion Laboratory, Pasadena, California, Feb. 1999, pp. 1-2.

* cited by examiner

*Primary Examiner*—Frank G Font
*Assistant Examiner*—Michael P Mooney
(74) *Attorney, Agent, or Firm*—Yee & Associates, P.C.; Kevin G. Fields (57) ABSTRACT

A method and apparatus for an optical fuel detection system. The optical fuel detection system comprises an outer tube, and inner tube, and a set of optical fibers. The outer tube has a reflective inner surface capable of reflecting light and is configured to allow a liquid fuel to enter an interior of the outer tube on which the reflective inner surface is located. The inner tube is located within the outer tube in which an area is present between the reflective inner surface. The set of optical fibers are mounted to an outer surface of the inner tube. Each optical fiber has a core that is exposed on each part of an optical fiber opposite to the reflective inner surface and the optical fiber has a refractive index that is lower that the liquid fuel but higher than a gaseous form of any gas that may enter the area.

22 Claims, 5 Drawing Sheets

FIBER OPTIC FUEL DETECTION SYSTEM

BACKGROUND INFORMATION

1. Field

The present disclosure relates generally to fiber optic devices and systems and in particular to a method and apparatus for detecting liquids. Still more particularly, the present disclosure relates to a method and apparatus for detecting fuel in a fuel tank.

2. Background

The amount of fuel present in an aircraft fuel tank is important for a pilot to know. The amount of fuel present can be used to verify fuel consumption of a flight. Measuring fuel levels in an aircraft fuel tank may be made using a fuel measurement system, such as a fuel gage. These systems include a sender unit and an indicator. The sending unit may be for example, a float connected to a variable resistor. The indicator may be an analog readout or a digital display of the amount of fuel present in the fuel tank.

In an aircraft, a capacitive probe is as another example of a sender unit. Multiple probes may be mounted within the fuel tank in low voltage capacitors are present. The fuel may go between the capacitors in the probes. At different fuel levels, different capacitances are present. The capacitance, in these types of systems, is proportionate to the height of the fuel in the tank. By receiving the capacitance values, the amount of fuel present in the fuel tank may be determined. This component, however, requires these components and wiring to be placed into the fuel tank.

Although they are reliable, failures do occasionally occur in a probe, requiring the aircraft to be taken out of service for maintenance. The replacement of one or more probes may take several days. Consequently, the aircraft is out of commission for this type of maintenance. Therefore, it would be advantageous to have a method and apparatus for detecting fuel that reduces the need for maintenance.

SUMMARY

The advantageous embodiments of the present invention provide a method and apparatus for an optical fuel detection system. The optical fuel detection system comprises an outer tube, and inner tube, and a set of optical fibers. The outer tube has a reflective inner surface capable of reflecting light and is configured to allow a liquid fuel to enter an interior of the outer tube on which the reflective inner surface is located. The inner tube is located within the outer tube in which an area is present between the reflective inner surface. The set of optical fibers are mounted to an outer surface of the inner tube. Each optical fiber has a core that is exposed on each part of an optical fiber opposite to the reflective inner surface and the optical fiber has a refractive index that is lower than the liquid fuel but higher than a gaseous form of any gas that may enter the area.

In another advantageous embodiment of the present invention, a fiber optic apparatus comprises an elongate housing and a set of optical fibers. The elongate housing has a sleeve capable of allowing a liquid to enter an interior of the sleeve and an inner member located within the sleeve in which an area is present between a surface of the inner member and an inner surface of the sleeve. A set of optical fibers is mounted within the elongate housing. Each optical fiber in the set of optical fibers has a core and a coating in which a portion of the core is exposed along a length of each optical fiber in the set of optical fibers, and wherein the portion faces a reflective surface within the elongate housing and wherein the reflective surface is capable of reflecting light.

In yet another advantageous embodiment of the present invention, a method is present for detecting a liquid. A light signal is sent to a fiber optic detector comprising a sleeve having a reflective inner surface on an interior of the sleeve capable of reflecting light and capable of allowing the liquid to enter the interior; an inner member located within the sleeve in which an area is present between a surface of the inner member and the reflective inner surface; a set of optical fibers mounted along the surface of the inner member, wherein each optical fiber in the set of optical fibers has an inner core and a coating in which a portion of the inner core is exposed along a length of each optical fiber in the set of optical fibers, wherein the portion faces the reflective inner surface. A response to the light signal is received to form a received response. The response is processed to detect the liquid.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
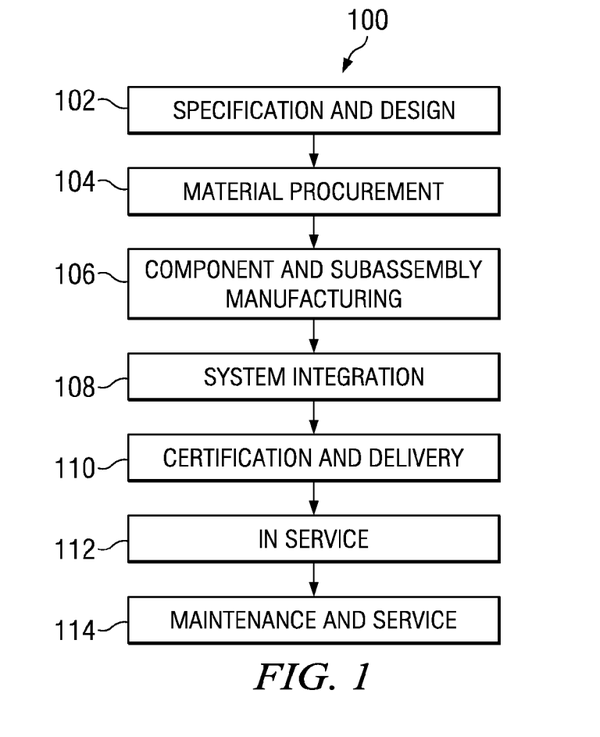
FIG. 1 is a diagram illustrating an aircraft manufacturing and service method in which an advantageous embodiment may be implemented.
Figure 2:
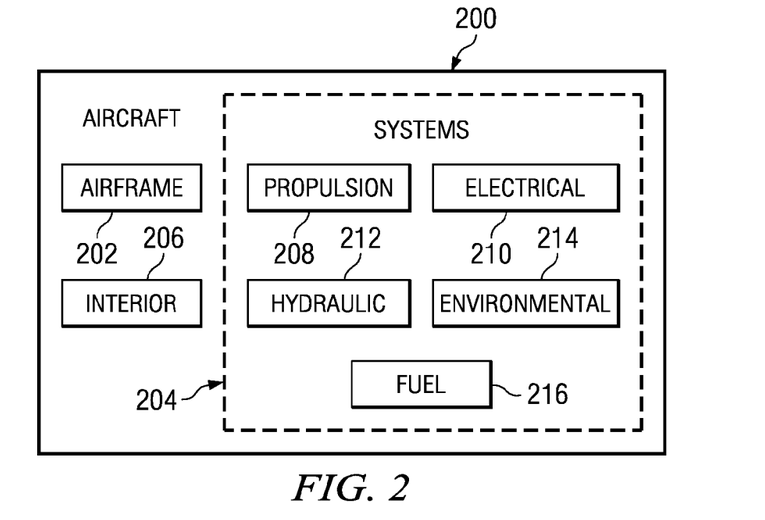
FIG. 2 is a block diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems within systems 204 and interior 206. Examples of systems 204 include one or more of propulsion system 208, electrical system 210, hydraulic system 212, environmental system 214, and fuel system 216. Any number of other systems may be included. Although an aerospace example is shown, the principles of the invention may be applied to other industries, such as the automotive industry.

Apparatus and methods embodied herein may be employed during any one or more of the stages of production and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, by substantially expediting the assembly of or reducing the cost of aircraft 200. Similarly, one or more of apparatus embodiments, method embodiments, or a combination thereof may be utilized while aircraft 200 is in service 112 in FIG. 1, for example, without limitation, to maintenance and service 114 in FIG. 1. In one illustrative example, a fiber optic device, in an advantageous embodiment, may be implemented in fuel system 216 or hydraulic system 212. The different embodiments may be used in any application in which detecting a presence of a liquid or an amount of liquid is desirable.

The different advantageous embodiments recognize that current fuel systems use capacitance probes to measure liquid fuel levels in fuel tanks. A capacitance probe contains components and wiring that intrude into the fuel tank. The different embodiments also recognize that current fuel capacitive fuel detection probes and their wiring also do fail occasionally, requiring time and effort in maintenance to replace. These types of systems also contribute to the weight of an aircraft.

Thus, the different advantageous embodiments provide a method and apparatus for detecting liquids using a fiber optic detector. In one embodiment, a fiber optic apparatus comprises a sleeve, an inner member, and a set of optical fibers. The sleeve has a reflective inner surface on an interior of the sleeve that is capable of reflecting light and capable of allowing liquid to enter the interior of the sleeve.

An inner member is located within the sleeve in which an area is present between a surface of the inner member and the reflective inner surface of the sleeve. Further, the set of optical fibers is a set of one or more optical fibers that are mounted along the surface of the inner member. Each optical fiber has a core and a coating in which a portion of the core is exposed along with a length of each optical fiber. In these examples, the portion faces the reflective inner surface.

The sleeve is an elongate member with a channel. In these examples, the sleeve takes the form of a tube. The inner member, in these examples, takes the form of an elongate member with a channel. This inner member may be, for example, a tube that is located within the sleeve such that the sleeve and the inner member are concentric with each other. In other examples, this inner member may be an elongate member without a channel, such as a rod.

In the different illustrative embodiments, the fiber optic detector may take different forms. For example, the fiber optic detector may be a fiber optic fuel presence sensor used to detect the presence of fuel. In other examples and embodiments, the fiber optic detector may be a fiber optic fuel probe that may be used to identify the amount of fuel present in the fuel tank.

Figures 3, 4:
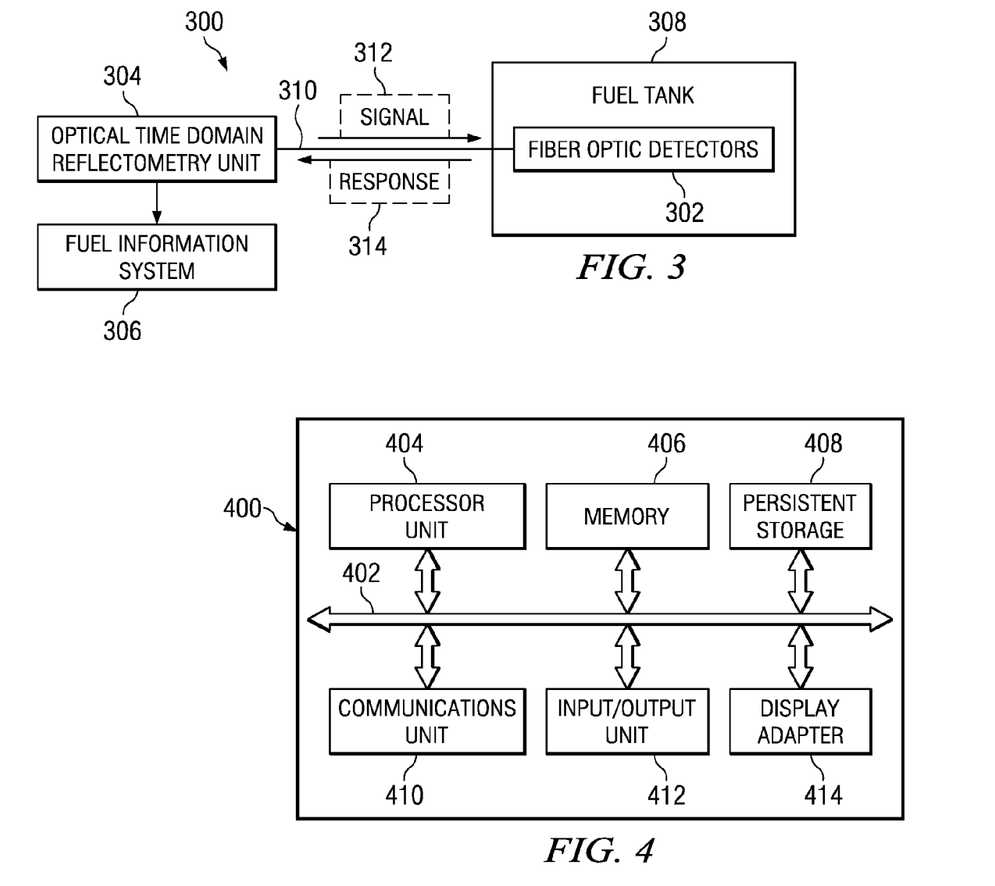
FIG. 3 is a diagram illustrating a fiber optic fuel detection system in accordance with an advantageous embodiment.
FIG. 4 is a diagram of a data processing system in accordance with an illustrative embodiment of the present invention.

Turning now to FIG. 3, a diagram illustrating a fiber optic fuel detection system is depicted in accordance with an advantageous embodiment. In this illustrative example, fiber optic fuel detection system 300 includes fiber optic detectors 302, optical time domain reflectometry unit 304, and fuel information system 306. Fiber optic detectors 302 is located in fuel tank 308.

Fiber optic detectors 302 is a set of one or more fiber optic detectors. Fiber optic detectors 302 may be used to identify or sense the presence or absence of fuel within fuel tank 308. In addition or alternatively, fiber optic detectors 302 may be used to identify the amount of fuel present within fuel tank 308.

Optical time domain reflectometry unit 304 is connected to fiber optic detectors 302 through fiber optic bus 310, which may contain one or more fiber optic cables. Depending on the particular implementation, fiber optic bus 310 may be a continuation or extension of fiber optic cables that are part of fiber optic detectors 302. Optical time domain reflectometry unit 304 transmits optical signal 312 through fiber optic bus 310. This unit measures the roundtrip time of transmitted optical signal 312 from fiber optic detectors 302 in fuel tank 308 as response 314. Optical time domain reflectometry unit 304 requires only a small amount of light to detect response 314. For example, response 314 may only be 0.1 percent of the intensity of optical signal 312. In some embodiments, optical time domain reflectometry unit 304 also may be modified to include software and/or hardware to identify the intensity of response 314 as compared to optical signal 312. With this data, optical time domain reflectometry unit 304 may send response 314 and/or other information such as round trip time, to fuel information system 306 for processing.

Fuel information system 306 is an apparatus or device that processes information and responses received by optical time domain reflectometry unit 304. This processing may include, for example, a presentation of response 314 in a form similar to that shown on an oscilloscope. In other examples, fuel information system 306 may present information that may identify the amount of fuel present within fuel tank 308 based on the data returned by optical time domain reflectometry unit 304. Additionally, a presence or absence of fuel in fuel tank 308 also may be identified by fuel information system 306, in these examples.

Fuel information system 306 may be a computer, or part of a flight control system located on an aircraft, such as aircraft 200 in FIG. 2. In identifying the amount of fuel present in fuel tank 308, fuel information system 306 may include various processes to calculate the amount of fuel present for irregular shaped fuel tanks through an appropriate placement of fiber optic detectors 302 within fuel tank 308. Fuel information system 306 may include processes that take into account the shape of fuel tank 308 to determine the amount of fuel remaining in fuel tank 308. Further, fuel information system 306 also may perform calibration processes to form a baseline before a first use or to maintain accuracy of fuel readings. The readings provided by fuel information system 306 may be integrated or averaged before presentation and may be provided at different time intervals.

In these examples, fiber optic detectors 302 are used to detect fuel in fuel tank 308. In other advantageous embodiments, fiber optic detectors 302 may be used to detect other liquids. For example, fiber optic detectors 302 may be used to detect the presence of water in a container or hydraulic fluids in a reservoir for a hydraulic system. The illustration of detecting fuel in a fuel tank is presented for purposes of illustration and not meant to limit the manner in which fiber optic detectors 302 may be used.

Turning now to FIG. 4, a diagram of a data processing system is depicted in accordance with an illustrative embodiment of the present invention. In this illustrative example, data processing system 400 includes communications fabric 402, which provides communications between processor unit 404, memory 406, persistent storage 408, communications unit 410, input/output (I/O) unit 412, and display 414. Data processing system 400 may be used to implement fuel information system 306 in FIG. 3. In particular, processes for fuel information system 306 in FIG. 3 may execute as instructions or computer usable program code on data processing system 400 to detect liquids. In the depicted embodiments, the detection of a liquid may include identify the amount of liquid present, a presence of the liquid, and/or an absence of the liquid.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display adapter 414 provides a mechanism to display information to a user. Display adapter 414 may be connected to a display in a cockpit and/or crewpit station in an aircraft. In these examples, input/output unit 412 may be used to receive information from optical time domain reflectometry unit 304 in FIG. 3. Further, this component also may be used to control the sending of signals to fiber optic detectors 302 in FIG. 3 from optical time domain reflectometry unit 304 in FIG. 3.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as computer usable program code or computer readable program code that may be read and executed by a processor in processor unit 404. The computer readable program code may be embodied on different physical or tangible computer readable media, such as, for example memory 406 or persistent storage 408.

Figure 5:
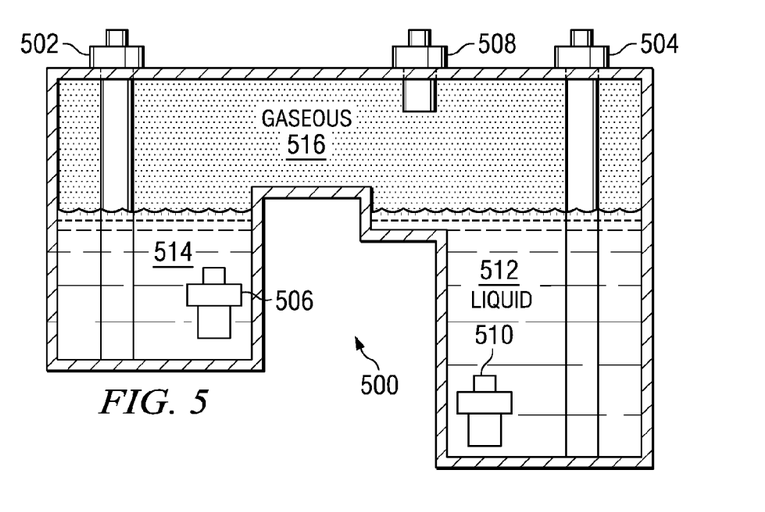
FIG. 5 is a diagram illustrating locations for fiber optic detectors in accordance with an advantageous embodiment.

Turning now to FIG. 5, a diagram illustrating locations for fiber optic detectors is depicted in accordance with an advantageous embodiment. In this particular example, fuel tank 500 has an irregular shape. Fuel tank 500 may have an irregular shape because of the location of fuel tank 500. For example, fuel tank 500 may be located in a wing or other area of an aircraft. In addition, irregular shapes may occur from interconnection of different sections of fuel tank 500 with each other. Fuel may be pumped from one section to another section as fuel is being used by an aircraft.

In this example, fiber optic detectors 502, 504 506, 508, and 510 are present in fuel tank 500. As depicted, fuel tank 500 is partially filled, having a liquid in sections 512 and 514. A gaseous or fuel ullage is present in section 516 in fuel tank 500.

Fiber optic detectors 502 and 504 are detectors used to identify or determine the amounts of fuel present in fuel tank 500. Fiber optic detectors 506, 508, and 510 are detectors used to detect the presence and/or absence of fuel in different sections of fuel tank 500.

Fiber optic detector 508 may be used to determine when fuel tank 500 is full. This type of detection is useful when refueling an aircraft. Fiber Optic detector 506 and fiber optic detector 510 are used to determine when fuel is no longer present in different portions of fuel tank 500. These types of detectors are placed in different portions of fuel tank 500 to determine when those portions no longer have fuel present. Of course, depending on the particular implementation, fiber optic detectors 502 and 504 may be used for the same purpose if they are present.

The configuration illustrated in FIG. 5, for fuel tank 500, is presented merely for purposes of illustration and not meant to limit the architecture in which fiber optic detectors may be implemented. The different fiber optic detectors illustrated in the different examples may be used with any type of container, open or closed.

Figure 6:
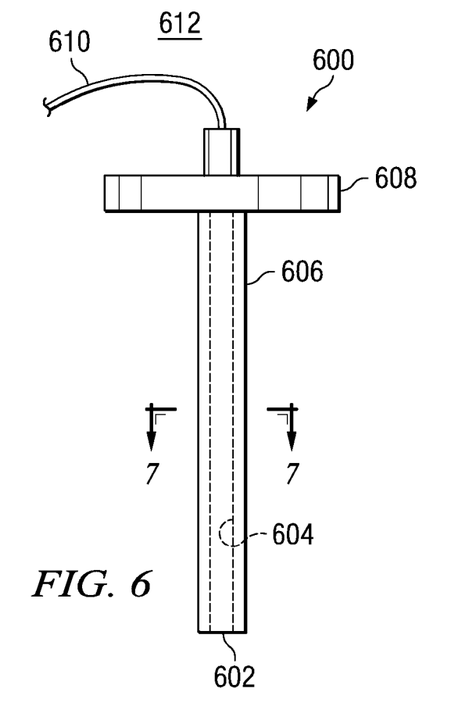
FIG. 6 is a diagram of a fiber optic fuel detector in accordance with an advantageous embodiment.

Turning now to FIG. 6, a diagram of a fiber optic fuel detector is depicted in accordance with an advantageous embodiment. In this example, fiber optic detector 600 is an example of a fiber optic detector that may be used in fiber optic detectors 302 in FIG. 3. Fiber optic detector 600 includes tube assembly 602, which in this example, includes inner tube 604 and an outer tube 606. In this example, outer tube 606 is open at end 602 to allow liquids to enter outer tube 606. Although a single opening or event is shown at end 602 to allow liquids to enter outer tube 606 in these examples, different locations for the vent may be used. Further, multiple openings or vents also may be configured or formed along the length of outer tube 606, depending on the particular implementation. Fiber optic detector 600 also includes mounting assembly 608, which provides a structure to mount optical detector to a part or component, such as a fuel tank. Mounting assembly 608 also may provide a connector to connect fiber optic detector 600 to an optical fiber cable, such as optical fiber cable 610.

A set of optical fibers (not shown) is located within tube assembly 602, in this example. The set of optical fibers is one or more optical fibers. An optical fiber is a fiber or cable that is designed to guide light along its length in a propagating form. These fibers may be made of a glass or plastic fiber, and signals may be transmitted in optical fibers.

In this example, fiber optic detector 600 is connected to optical fiber cable 610. Optical fiber cable 610 contains a set of optical fibers. The set of optical fibers are one or more fibers. Optical fiber cable 610 may be a separate cable that is connected to set of optical fibers within tube assembly 602. Alternatively, optical fiber cable 610 may be an extension or continuation of the set of optical fibers within tube assembly 602, in these examples.

Figure 7:
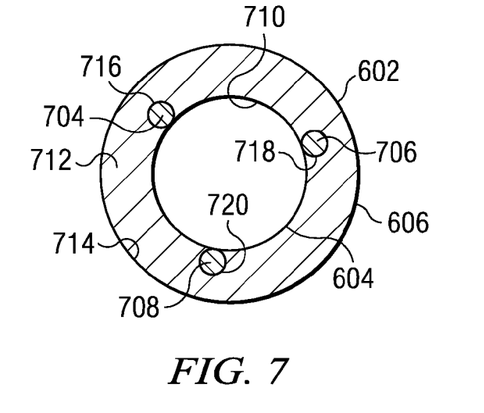
FIG. 7 is a diagram illustrating a cross-section of a fiber optic detector in accordance with an advantageous embodiment.

Turning now to FIG. 7, a diagram illustrating a cross-section of a fiber optic detector is depicted in accordance with an advantageous embodiment. In this example, the cross-section is taken along lines 7-7 in FIG. 6. Tube assembly 602 includes outer tube 606 and inner tube 604. Optical fibers 704, 706, and 708 are shown mounted longitudinally within tube assembly 602. Optical fibers 704, 706, and 708 are mounted to surface 710 of inner tube 604. Outer tube 606 and inner tube 604 are two concentric tubes, in these examples. Outer tube 606 is open at one end, in these examples, to allow a liquid to enter area 712 between surface 710 of inner tube 604 and surface 714 of outer tube 606.

In these examples, surface 714 is a reflective surface. Surface 710 is non-reflective in these examples. Of course, depending on a particular implementation, surface 710 also may be made reflective. Further, portions of surfaces 716, 718, and 720 of optical fibers 704, 706, and 708 are constructed or removed on the side facing or around perpendicular to surface 714 of outer tube 606. The surface or coating of these optical fibers is removed all along the length or portion of the optical fibers that may be exposed to the liquid.

In these examples, a single optical fiber may be configured or included for purposes of calibration. This type of optical fiber would not have any of its coating removed, or may have its coating removed with the end of the optical fiber being fitted with a reflector. In other implementations, all of the different optical fibers may be fitted with a reflector at the end, to provide for a return signal, even if no liquid is present for purposes of calibrating an optical fuel measurement system.

Although outer tube 606 is shown as a cylinder, other types of sleeves having different shapes may be used. For example, the cross section of a sleeve may be a pentagon, a hexagon, or an octagon, instead of a circle. The cross section shape of inner tube 604 also may vary. Further, inner tube 604 may take other forms, depending on the implementation. For example, a rod or solid member also may be used, depending on the implementation.

In these examples, the shape of the sleeve and the inner tube may be different from each other or may be the same. The particular shapes selected for the cross sections are selected such that the inner tube may fit within the outer sleeve and allow for fiber alignment with the reflective surface opposite to the surface on which the optical fibers are mounted.

Also, the number of optical fibers used may vary, depending on the implementation. Just one optical fiber may be used, or five optical fibers may be used. Additional optical fibers may help provide redundancy and error checking by determining if all of the results are around the same result.

Figure 8:
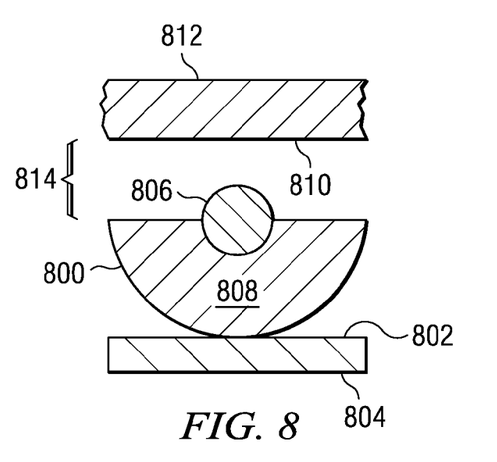
FIG. 8 is a diagram illustrating a cross-section of a fiber optic cable in accordance with an advantageous embodiment.

Turning now to FIG. 8, a diagram illustrating a cross-section of a fiber optic cable is depicted in accordance with an advantageous embodiment. In this example, optical fiber 800 is an example of an optical fiber, such as optical fibers 704, 706, or 708 in FIG. 7. Optical fiber 800 is attached to surface 802 of inner tube 804, which is similar to inner tube 604 in FIG. 7. Optical fiber 800 has core 806 and coating 808. Core 806 is a conducting core, which propagates light signals along the length of optical fiber 800. Coating 808 is configured to allow light traveling along core 806 to reflect or bounce such that light does not escape core 806.

In these examples, however, coating 808 does not cover the entire portion of core 806. Instead, the portions of coating 808 facing surface 810 of outer tube 812 are absent. This portion of coating 808 may be removed or optical fiber 800 may be manufactured in this configuration.

In the illustrative example, around half of coating 808 has been removed or is absent in optical fiber 800. The amount of coating 808 removed may vary, depending on the particular implementation. Additional or less portions of core 806 may be exposed, depending on the particular implementation. In these examples, optical fiber 800 is selected to have a refractive index that is higher than any gaseous atmosphere that may be present in a fuel tank.

The refractive index is set to be lower than that of the fuel. Of course, with other implementations, if other liquids are used, the refractive index is selected to be lower than the refractive index of the liquid that is to be detected. This selection of a refractive index for optical fiber 800 is made to prevent or minimize light escaping from the exposed portion of the fiber, unless the fiber is covered with the liquid. When a portion of optical fiber 800 is covered with liquid, the light signal traveling along optical fiber 800 travels through the liquid to surface 810 and is reflected back to core 806 and travels back towards the optical time domain reflectometry unit.

Surface 810 may be made reflective in a number of different ways. For example, a highly polished aluminum surface may be coated on surface 810 of outer tube 812. In another example, outer tube 812 may have chrome plating. Further, the composition of outer tube 812 and inner tube 804 may take various forms. In these examples, a composite material may be used for these tubes. In other implementations, depending on weight considerations, the tubes may be made using other materials, such as aluminum.

Distance 814 between surface 810 and core 806 also may vary, depending on the particular implementation. In these examples, distance 814 is selected to prevent bridging of the surfaces by a single drop to prevent false identification of a presence of fuel or a false identification of the amount of fuel present in the fuel tank. In these examples, a single optical fiber may be configured or included for purposes of calibration. This type of optical fiber would not have any of its coating removed, or may have its coating removed with the end of the optical fiber being fitted with a reflector. In other implementations, all of the different optical fibers may be fitted with a reflector at the end of the fiber to provide for a return signal, even if no liquid is present for purposes of calibrating an optical fuel measurement system.

Figure 9:
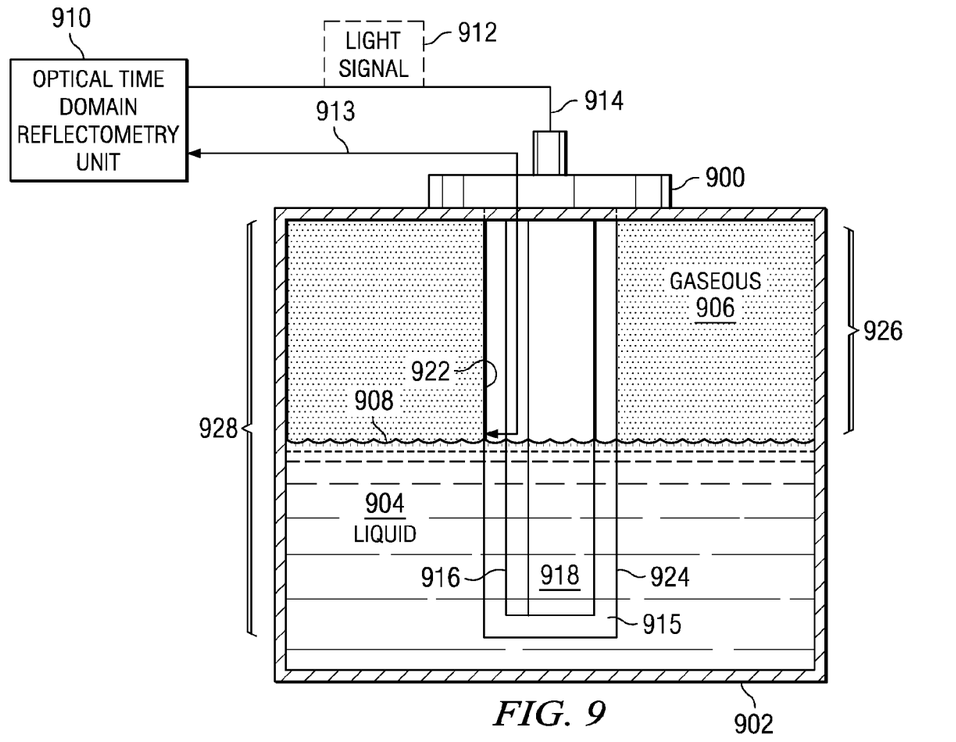
FIG. 9 is a diagram illustrating a fiber optic fuel detector in a fuel tank in accordance with an advantageous embodiment.

With reference next to FIG. 9, a diagram illustrating a fiber optic fuel detector in a fuel tank is depicted in accordance with an advantageous embodiment. Fiber optic detector 900 may be implemented using a fiber optic detector, such as fiber optic detector 600 in FIG. 6. In this example, fiber optic detector 900 is located inside a container, such as fuel tank 902. Liquid fuel is present in section 904 of fuel tank 902. A gaseous form of fuel is present in section 906, in these depicted examples. The interface between the liquid in section 904 and the gas in section 906 is surface 908.

In these examples, optical time domain reflectometry unit 910 sends light signal 912 along path 913 through optical fiber cable 914 into tube assembly 915 in fiber optic detector 900. Light signal 912 travels along path 913 inside optical fiber 916 attached to inner tube 918 until light signal 912 encounters surface 908.

When light signal 912 encounters surface 908, light signal 912 travels along path 913, across surface 908, to surface 922 of outer tube 924. Light signal 912 is reflected by surface 922, travels back across surface 908, and propagates in optical fiber 916 and through optical fiber cable 914 along path 913 to optical time domain reflectometry unit 910. Only a single optical fiber is shown in this example for purposes if illustrating path 913 taken by light signal 912.

In these examples, light signal 912 is reflected at surface 908 of liquid in section 904 because the refractive index of the optical fiber is lower than that of the liquid in section 904. If the refractive index of the liquid equals the refractive index of the fibers, light signal 912 will enter the liquid from the optical fiber. The refractive index of the optical fiber is selected to be higher than that of any gas that may enter the area within tube assembly 915. The refractive index is selected to be lower than the liquid such that when the surface of the liquid is encountered, light signal 912 will propagate along the surface rather than continue along optical fiber 916. The refractive index is selected to be higher than the gas in section 906 to keep light signal 912 propagating in the exposed core and to avoid losses in light signal 912.

In this example, light signal 912 travels distance 926, which is less than distance 928, which is the length of optical fiber 918 within fiber optic detector 900. Based on the time taken to travel from optical time domain reflectometry unit 910 through optical fiber cable 914 and distance 928 and back, optical time domain reflectometry unit 910 identifies the distance traveled to and from fiber optic detector 900. This distance may be compared to the expected distance when liquid is not present within fuel tank 902.

When fuel is not present, light signal 912 travels the entire length of optical fiber cable 914 and the optical fibers within tube assembly 915 and returns to optical time domain reflectometry unit 910, in these examples. This propagation of light signal 912 along distance 928 may be used to calibrate a measurement system and also may be used to determine when fuel tank 902 is empty. This type of calibration may occur if the optical fibers in optical fiber cable 914 have a reflector at the end of these optical fibers. In other embodiments, a single optical fiber may be included that is used only for calibration purposes if reflectors at the ends of the other optical fibers are not desired. In this manner, the amount of fuel within fuel tank 902 may be identified through calculating the difference in the time it takes to travel between optical time domain reflectometry unit 910 and fiber optic detector 900.

If fiber optic detector 900 is used to detect a presence and/or absence of a liquid, fiber optic detector 900 is configured such that light signal 912 does not return if a liquid is not present. A liquid is considered to be absent if no portion of optical fiber 916 is immersed in the liquid to cause light signal 912 to travel in the path described above. Alternatively, if light signal 912 does return, the strength or intensity of light signal 912 is a level indicating a liquid is present.

Figure 10:
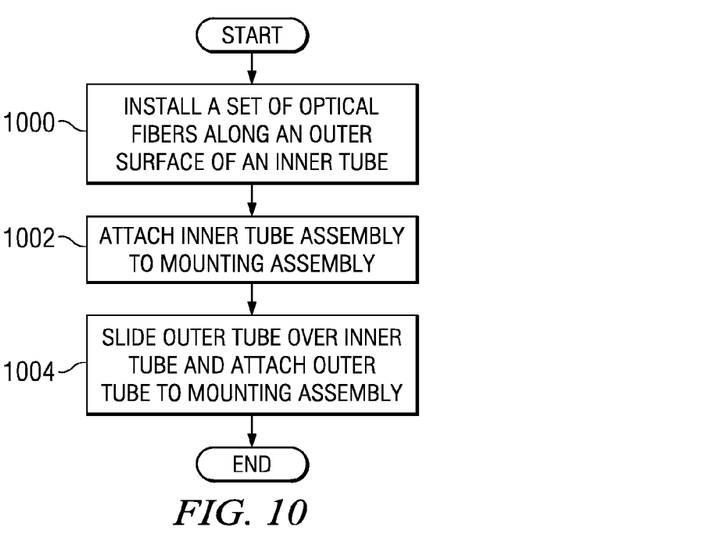
FIG. 10 is a flowchart of a process for manufacturing a fiber optic detector in accordance with an advantageous embodiment.

Turning now to FIG. 10, a flowchart of a process for manufacturing a fiber optic detector is depicted in accordance with an advantageous embodiment.

The process begins by installing a set of optical fibers on an outer surface of an inner tube (operation 1000). The set of optical fibers may be one or more fibers, depending on the particular implementation.

The process then attaches the inner tube assembly to the mounting assembly (operation 1002). Thereafter, the process slides the outer tube over the inner tube and attaches the outer tube to the mounting assembly (operation 1004), with the process terminating thereafter. In these examples, the outer tube is configured with one or more vents to allow liquid to enter the area between the inner tube and the outer tube.

Figure 11:
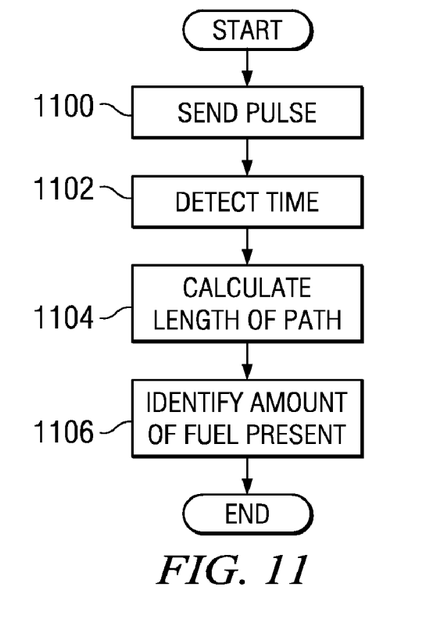
FIG. 11 is a flowchart of a process for identifying an amount of fuel present in a fuel tank in accordance with an advantageous embodiment.

With reference next to FIG. 11, a flowchart of a process for identifying an amount of fuel present in a fuel tank is depicted in accordance with an advantageous embodiment. The process illustrated in FIG. 11 may be implemented in a data processing system, such as data processing system 400 in FIG. 4.

The process begins by sending a light pulse through the fiber optic detector (operation 1100). Operation 1100 may be implemented by sending a signal to an optical time domain reflectometry unit, such as optical time domain reflectometry unit 304 in FIG. 3, to generate the light pulse. Thereafter, the time for the light pulse to reflect back is detected (operation 1102).

The detected time is then used to calculate the length of the path (operation 1104). The length of the path traveled by the light pulse may be determined by comparing the actual time with the time needed to travel the entire length of the fiber optic detector, if fuel did not cause the light pulse to be reflected back earlier in the path. The amount of fuel present is then identified (operation 1106), with the process terminating thereafter. The identification of the fuel present may be made using different processes and algorithms currently used with capacitance detectors.

Figure 12:
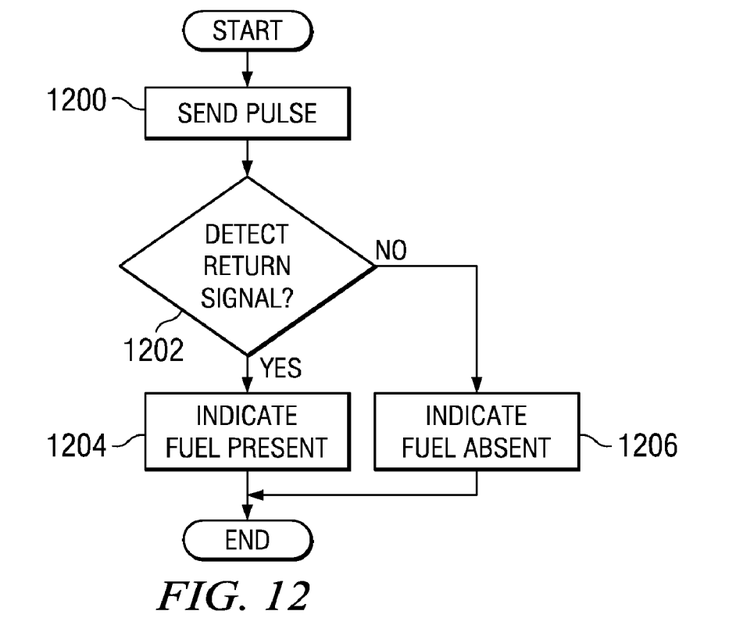
FIG. 12 is a flowchart of a process for detecting the presence of fuel in accordance with an advantageous embodiment.

Turning now to FIG. 12, a flowchart of a process for detecting the presence of fuel is depicted in accordance with an advantageous embodiment. The process illustrated in FIG. 12 may be implemented in a data processing system, such as data processing system 400 in FIG. 4.

The process begins by sending a light pulse through the fiber optic cable (operation 1200). Thereafter, a determination is made as to whether a return signal is detected (operation 1202). In these examples, a return signal is detected if the response exceeds some threshold level of light. When no fuel is present, the light travels through the fiber optic cable and either the light pulse is not reflected back or some reduced amount of light is reflected back to indicate that fuel is not present. If a return signal is detected, an indication that fuel is present is made (operation 1204), with the process terminating thereafter.

With reference again to operation 1202, if a return signal is not detected, an indication that fuel is absent is made (operation 1206), with the process terminating thereafter.

The process illustrated in FIG. 12 also may be implemented in detectors used to identify the amount of fuel present. If no fuel is present, then a signal also may not be returned.

In these examples, a tube is used to reduce the amount of weight in an aircraft. The different optical detectors may be placed in different locations in the fuel tank or in a number of different fuel tanks. For example, an aircraft may have four to five fuel tanks that are emptied in a certain sequence. Further, the refueling of the tanks also may occur in a certain sequence.

In these examples, the length of the probe may vary depending on the use. When used as a sensor to detect whether fuel is present, the fiber optic detector may only be 0.25 inches long. When used to identify the amount of fuel present, the fiber optic detector may be, for example, five to six feet long.

Thus, the different embodiments provide a method and apparatus for detecting a liquid. The detection may be a presence or an amount of liquid. A light signal is sent to a fiber optic detector comprising a sleeve having a reflective inner surface on an interior of the sleeve capable of reflecting light and capable of allowing the liquid to enter the interior; an inner member located within the sleeve in which an area is present between a surface of the inner member and the reflective inner surface; a set of optical fibers mounted along the surface of the inner member, wherein each optical fiber in the set of optical fibers has an inner core and a coating in which a portion of the inner core is exposed along a length of each optical fiber in the set of optical fibers, wherein the portion faces the reflective inner surface. A response to the light signal is received to form a received response. The response is processed to detect the liquid.

The different advantageous embodiments allow for detecting liquids with a probe manufactured with lighter weight materials, as compared to currently available fuel detection systems. Further, the different advantageous embodiments may provide a more reliable system because the components located in a container, such as a fuel tank, are less likely to fail. The optical fibers used in the different embodiments do not have corrosion problems that may occur with capacitive fuel detection systems. As a result, time and expense needed to replace fuel detectors are reduced.

The description of the different advantageous embodiments has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. For example, although the depicted embodiments show the optical fibers mounted to the inner tube or member, the optical fibers could be mounted on the outer tube or sleeve. The portions of the optical fibers facing the surface of the inner tube or member would be configured to expose the core of the optical fibers. In this type of embodiment the inner tube or member is constructed or configure to have a reflective surface and the outer tube or sleeve does not need to have a reflective inner surface.

Of course, in other embodiments, the optical fibers may be located on both the inner surface of the outer tube or sleeve and on the outer surface of the inner tube or member. In this type of embodiment, both surfaces are configured to be reflective. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An optical fuel detection system comprising:
   an outer tube having a reflective inner surface capable of reflecting light and configured to allow a liquid fuel to enter an interior of the outer tube on which the reflective inner surface is located;
   an inner tube located within the outer tube in which an area is present between the reflective inner surface; and
   a set of optical fibers mounted to an outer surface of the inner tube wherein each optical fiber in the set of optical fibers has a core that is exposed on each part of an optical fiber opposite to the reflective inner surface and wherein the optical fiber has a refractive index that is lower that the liquid fuel but higher than a gaseous form of any gas that may enter the area.

2. The optical fuel detection system of claim 1, wherein the optical fuel detection system is used to detect a presence of fuel in a tank.

3. The optical fuel detection system of claim 1, wherein the optical fuel detection system is used to identify an amount of fuel in a tank.

4. The optical fuel detection system of claim 1 further comprising:
   an optical time domain reflectometry unit capable of sending and receiving light signals.

5. A fiber optic apparatus comprising:
   an elongate housing having a sleeve capable of allowing liquid to enter an interior of the sleeve and an inner member located within the sleeve in which an area is present between a surface of the inner member and an inner surface of the sleeve; and
   a set of optical fibers mounted within the elongate housing, wherein each optical fiber in the set of optical fibers has a core and a coating in which a portion of the core is exposed along a length of each optical fiber in the set of optical fibers, and wherein the portion faces a reflective surface within the elongate housing and wherein the reflective surface is capable of reflecting light.

6. The fiber optic apparatus of claim 5, wherein the reflective surface is the inner surface of the sleeve and wherein the set of optical fibers is mounted on the surface of the inner member.

7. The fiber optic apparatus of claim 5, wherein the reflective surface is the surface of the inner member and the set of optical fibers is mounted on the inner surface of the sleeve.

8. The fiber optic apparatus of claim 5, wherein the reflective surface comprises both the inner surface of the sleeve and the surface of the inner member and wherein a first portion of the set of optical fibers is mounted on the surface of the inner member and a second portion of the set of optical fibers is mounted on the inner surface of the sleeve.

9. The fiber optic apparatus of claim 5, wherein each optical fiber in the set of optical fibers has a refractive index less than a liquid that may be present in the area.

10. The fiber optic apparatus of claim 9, wherein each optical fiber in the set of optical fibers has a refractive index greater than a gas that may be present in the area.

11. The fiber optic apparatus of claim 5 further comprising:
    a container, wherein the sleeve is mounted in the container.

12. The fiber optic apparatus of claim 11 further comprising:

a light pulse generation unit connected to the set of optical fibers, capable of generating a light pulse, and capable of receiving a response and measuring light signal travel time.

13. The fiber optic apparatus of claim 12, wherein the length is a part of each optical fiber in the set of optical fibers located in the container.

14. The fiber optic apparatus of claim 12 further comprising:

a data processing system connected to the light pulse generation unit, wherein the data processing system identifies an amount of liquid in a tank in response to the light pulse generation unit receiving the response.

15. The fiber optic apparatus of claim 5, wherein the area provides a gap between the set of optical fibers and the reflective inner surface that is large enough to prevent the bridging of a drop of liquid between the reflective inner surface and the set of optical fibers.

16. The fiber optic apparatus of claim 5, wherein the sleeve is a tube.

17. The fiber optic apparatus of claim 5, wherein the sleeve has a cross section shape selected from one of a circle, a pentagon, a hexagon, and an octagon.

18. The fiber optic apparatus of claim 5, wherein the inner member is one of a tube and a rod.

19. A method for detecting a liquid, the method comprising:

sending a light signal to a fiber optic detector comprising:

a sleeve having a reflective inner surface on an interior of the sleeve capable of reflecting light and capable of allowing the liquid to enter the interior;

an inner member located within the sleeve in which an area is present between a surface of the inner member and the reflective inner surface;

a set optical fibers mounted along the surface of the inner member, wherein each optical fiber in the set of optical fibers has an inner core and a coating in which a portion of the inner core is exposed along a length of each optical fiber in the set of optical fibers, wherein the portion faces the reflective inner surface;

receiving a response to the light signal to form a received response; and processing the response to detect the liquid.

20. The method of claim 19, wherein the processing step comprises:

determining a light signal travel time in response to the received response to form a measured light signal travel time; and identifying the amount of the liquid present in a container based on the measured light signal travel time.

21. The method of claim 19, wherein the processing step comprises:

identifying a presence of the liquid based on the received response.

22. The method of claim 19, wherein the processing step comprises:

identifying an absence of the liquid based on an absence of the received response.

\* \* \* \* \*